United States Patent
Rollet (10) Patent No.: US 10,466,364 B2
(45) Date of Patent: Nov. 5, 2019

(54) METHODS AND DEVICES FOR VALIDATING THE SYNCHRONIZATION BETWEEN A GEOLOCALIZING RECEPTOR AND AN EMITTING SATELLITE

(71) Applicant: Thales, Courbevoie (FR)

(72) Inventor: Stéphane Rollet, Valence (FR)

(73) Assignee: THALES, Courbevoie (FR)

( * ) Notice: Subject to any disclaimer, the term of this patent is extended or adjusted under 35 U.S.C. 154(b) by 329 days.

(21) Appl. No.: 15/367,212

(22) Filed: Dec. 2, 2016

(65) Prior Publication Data

US 2017/0170866 A1 Jun. 15, 2017

(30) Foreign Application Priority Data

Dec. 11, 2015 (FR) ...................................... 15 02575

(51) Int. Cl.
*G01S 19/24* (2010.01)
*H04B 1/7075* (2011.01)
*H04B 1/709* (2011.01)

(52) U.S. Cl.
CPC ............ *G01S 19/24* (2013.01); *G01S 19/243* (2013.01); *H04B 1/70752* (2013.01); *H04B 1/70755* (2013.01); *H04B 1/709* (2013.01); *H04B 2201/7073* (2013.01)

(58) Field of Classification Search
CPC .... G01S 19/243; G01S 19/256; G01S 19/258; G01S 19/20; G01S 19/21; G01S 19/23
See application file for complete search history.

(56) References Cited

U.S. PATENT DOCUMENTS

| | | | | |
|---|---|---|---|---|
| 6,144,691 A | * | 11/2000 | Kenney | H04B 1/70752 375/130 |
| 6,363,049 B1 | * | 3/2002 | Chung | H04B 1/7075 370/210 |

(Continued)

FOREIGN PATENT DOCUMENTS

JP 11-118900 A 4/1999

OTHER PUBLICATIONS

French Patent Application No. 15 02575, Rapport de Recherche Preliminaire, Aug. 23, 2016, 2 pages.

*Primary Examiner* — Gregory C. Issing
(74) *Attorney, Agent, or Firm* — Soquel Group LLC (57) ABSTRACT

A method between a geolocation receiver and an identified transmitting satellite, the receiver being able to receive a composite radio signal including a plurality of navigation signals each transmitted by a transmitting satellite that is part of a satellite constellation, a method for validating the synchronization between a geolocation receiver and a transmitting satellite during a phase for acquiring an augmentation signal including geolocation correction and integrity data; the methods include, for each identified transmitting satellite, extracting received ephemeris words or received words of any type of the received signal associated with the identified satellite as it is received, and comparing at least one received word with at least one word of the same rank or stored for the identified satellite and/or for at least one other satellite; the validation or non-validation of the synchronization with the identified transmitting satellite depends on a predetermined false alarm probability and/or non-detection probability.

19 Claims, 4 Drawing Sheets

(56) References Cited

U.S. PATENT DOCUMENTS

| | | | | |
|---|---|---|---|---|
| 7,026,986 B2* | 4/2006 | Turetzky | ............... | G01S 5/0027 |
| | | | | 342/357.46 |
| 7,636,060 B2* | 12/2009 | Li | ............................ | H04L 1/08 |
| | | | | 342/357.63 |
| 7,746,961 B2* | 6/2010 | Reial | .................. | H04B 1/70755 |
| | | | | 375/341 |
| 8,018,988 B2* | 9/2011 | Monnerat | ............... | G01S 19/30 |
| | | | | 370/516 |
| 2006/0285580 A1* | 12/2006 | Kinnunen | .......... | H04B 1/70751 |
| | | | | 375/147 |
| 2012/0134392 A1 | 5/2012 | Nagahara et al. | | |
| 2014/0372496 A1* | 12/2014 | Zhang | .................. | G01S 19/246 |
| | | | | 708/606 |
| 2015/0009065 A1* | 1/2015 | Rao | ........................ | G01S 19/21 |
| | | | | 342/357.25 |

* cited by examiner

METHODS AND DEVICES FOR VALIDATING THE SYNCHRONIZATION BETWEEN A GEOLOCALIZING RECEPTOR AND AN EMITTING SATELLITE

CROSS REFERENCE TO RELATED APPLICATIONS

This application claims priority under 35 USC § 119 of French Patent Application No. 15 02575 filed on Dec. 11, 2015.

FIELD OF THE INVENTION

The present invention relates to a method for validating the synchronization between a geolocalizing receiver and a transmitting satellite during a phase for acquiring a navigation signal from this satellite, and an associated geolocalizing receiver.

The invention also relates to a method for validating the synchronization between a geolocalizing receiver and a transmitting satellite during a phase for acquiring an augmentation signal comprising geolocation correction and integrity data for a predetermined global navigation satellite system, and an associated geolocation receiver.

The invention falls within the field of global navigation satellite systems (GNSS).

BACKGROUND OF THE INVENTION

In general, a GNSS system is made up of a plurality of satellites, or constellation of satellites, allowing a portable geolocation receiver to determine positioning information, in a land-based plane of reference, also called position, speed and time (PST) information.

There are currently several GNSS systems, which in particular include the GPS system, the GLONASS system or the GALILEO system, which is expected to be brought online soon.

The satellites of such a GNSS system are able to emit radio signals in particular comprising navigation information.

Each item of navigation information generally comprises data relative to the transmission time by the satellite of the corresponding signal and the current position of the satellite. In particular, the data relative to the current position of the satellite generally contain the almanac providing a rough position of the satellite and the ephemerides giving the exact current position of the satellite.

The item of navigation information is carried by a carrier wave and modulated by a spreading code specific to each satellite. Thus, the signals are emitted by the satellites using a spread spectrum technique.

The geolocation receiver, also called GNSS receiver, is able to receive the signal emitted by the satellites and to extract the navigation information therefrom in particular to determine the distance to the transmitting satellite that transmitted the corresponding signal.

This distance, also called pseudo-distance, is determined by analyzing the propagation delay of the corresponding signal.

To determine the PST positioning information, the receiver performs a digital processing of the navigation information from at least three different satellites.

In practice, to have a more precise position, the receiver needs navigation information from at least four different satellites.

More specifically, to acquire the navigation information from a given satellite, the receiver implements two phases processing the signals from this satellite.

During an initial phase, called acquisition phase in the state of the art, the receiver generates a local signal in particular containing a local spreading code showing the image of the spreading code of the satellite.

Since the receiver does not initially know its position, the local signal is not synchronized with the received signal. This in particular means that the local signal is carrier frequency-shifted from the received signal by a value called Doppler value, and the spreading code of the received signal is delayed from the local spreading code by a value called delay value.

The receiver then searches for a peak in the correlations between the local signal and the received signal by trying different Doppler and delay values.

When a peak is detected, the receiver determines the Doppler and delay values corresponding to this peak and from these values, launches a following phase, called continuation phase in the state of the art.

During the continuation phase, the receiver regularly updates the Doppler and delay values, and extracts the item of navigation information from the signal emitted by the satellite in particular using the local spreading code and the determined Doppler and delay values.

At the end of the acquisition phase, the receiver is considered to have synchronized itself with the emitting satellite or has "locks on" to this satellite, owing to the detection of the correlation peak.

Sometimes, the receiver synchronizes its local signal corresponding to the desired satellite with the signal received from another satellite, which leads to an erroneous distance measurement, and therefore potentially a false position.

In this case, this is a false synchronization or a false "lock", which is also called cross-correlation. In this case, the computation of the position information of the receiver is distorted.

In particular, the cross-correlation error occurs when the satellites emit GNSS signals with a short periodic code, for example GPS L1 C/A ("coarse acquisition") signals, corresponding to a frequency of 1575.42 MHz, SBAS L1 C/A and GALILEO L1 BC.

A similar phenomenon also occurs when the received signal comes from a satellite transmitting position correction information, in a space-based augmentation system, called SBAS system.

Different methods exist in the state of the art making it possible to avoid such false synchronization or cross-correlation.

Thus, one method, used conventionally, consists of verifying the consistency between the position of the satellite computed from ephemerides contained in the item of navigation information and that computed from the decoded almanacs. The almanacs contain the identifiers of all of the transmitting satellites in the constellation, unlike the ephemerides. An inconsistency between these values therefore indicates a false synchronization.

Indeed, the ephemeris data from the satellite makes it possible to estimate the position of this satellite with a precision of several meters, but is only transmitted by the satellite itself and is only valid for several hours.

The almanac data for the entire constellation of satellites makes it possible to estimate the position of each of the satellites roughly, to within several hundred kilometers, but is transmitted by all of the satellites in the constellation and is valid for several days.

Thus, if the difference between the position computed from the ephemerides and the position computed from the almanacs is greater than the mean distance between transmitting satellites, an error, and therefore a cross-correlation, is considered to exist.

In order to avoid a false cross-correlation detection and guarantee the integrity of the positioning information computed by a GNSS receiver, RTCA (Radio Technical Commission for Aeronautics) standard DO-229 "Minimum Operational Performance Standards for Global Positioning System" requires complete decoding of all of the received ephemeris data twice and a comparison with the decoded almanac data for all of the satellites.

For a given transmitting satellite, a complete set of ephemeris data is made up of a given number of ephemeris words, each having an associated rank and encoding information relative to the transmitting satellite, this information making it possible to compute the position of the transmitting satellite. The ephemeris data is resent periodically, and refreshed at a given frequency, for example every two hours for GPS satellites.

The ephemeris words are sent in sub-frames of the transmitted signal, the transmission of all of the words of an ephemeris requiring a plurality of sub-frames.

Thus, the traditional method for validating the absence of a cross-correlation takes a relatively long amount of time, which is from 48 seconds to 60 seconds for the GPS system and several minutes for the SBAS system.

The present invention aims to resolve this drawback.

SUMMARY OF THE DESCRIPTION

To that end, according to a first aspect, the invention proposes a method for validating the synchronization between a geolocation receiver and a transmitting satellite during a phase for acquiring a navigation signal from this satellite, said receiver being able to receive a composite radio signal including a plurality of navigation signals each transmitted by a transmitting satellite that is part of a satellite constellation, and to implement a phase for acquiring a navigation signal for each of the transmitting satellites, in which the receiver determines a satellite transmitting a corresponding navigation signal in a synchronization step, each transmitting satellite further transmitting sets of ephemerides made up of a plurality of words, each having an associated rank, encoding information relative to said transmitting satellite and making it possible to compute the position of said transmitting satellite in a given plane of reference.

The method is carried out by said receiver and includes, for each identified transmitting satellite, performing a validation test, comprising:
  extracting ephemeris words from the navigation signal associated with the satellite identified in the acquisition phase, as said navigation signal is received, and
  comparing at least part of said extracted ephemeris words to at least one stored ephemeris word with the same rank for said identified transmitting satellite and/or for at least one of the other transmitting satellites, and, based on the result of the comparison, validating or not validating the synchronization with said identified transmitting satellite, when the comparisons done make it possible to achieve a predetermined false alarm probability and/or non-detection probability.

Advantageously, the invention makes it possible to validate the synchronization of the receiver with a transmitting satellite from only part of the received ephemeris words, and consequently to greatly reduce the time needed to confirm the absence or presence of a false synchronization.

The synchronization validation method according to the invention may also have one or more of the features below, considered independently or in combination, according to all technically possible combinations.

After the extraction step, the method includes a step for verifying a protection code associated with one or several of said extracted ephemeris words, the comparison being done on the extracted ephemeris words for which the verification is positive.

The method includes storing ephemeris words previously validated for said transmitting satellite, and comparing a received ephemeris word with the stored ephemeris word with the same rank for said transmitting satellite.

It further includes a prior step for estimating a probability, for each ephemeris word of the set of ephemerides, that an ephemeris word, having an associated rank and transmitted by a given transmitting satellite, has a same value as a transmitted ephemeris word with the same rank transmitted by another satellite in the satellite constellation.

It includes computing sets of ranks of ephemeris words, each said set of ranks designating ephemeris word ranks allowing validation of the associated transmitting satellite with a corresponding non-detection probability.

The method includes a step for storing at least one set of computed ephemeris rank sets corresponding to a predetermined non-detection probability.

In case of positive comparison of a received ephemeris word with an ephemeris word previously validated and stored for said transmitting satellite, it includes a validation based on whether the rank of said received ephemeris word belongs to at least one of said computed sets of ephemeris ranks.

The method includes comparing an extracted ephemeris word with a stored ephemeris word having the same rank for said identified transmitting satellite, and with an ephemeris word of the same rank received for each of the plurality of other transmitting satellites.

If the extracted ephemeris word is identical to the stored ephemeris word having the same rank for said identified transmitting satellite, and different from each of the ephemeris words having the same rank received for another transmitting satellite, a validity counter is incremented.

If the extracted ephemeris word is different from the stored ephemeris word having the same rank for said identified satellite, and identical to at least one of the words having the same rank received for another transmitting satellite, an invalidity counter is incremented.

The validation or invalidation of the synchronization is done based on the comparison of the validity counter or invalidity counter to a number of comparisons to be taken into consideration, said number of comparisons to be taken into consideration depending on the predetermined false alarm probability and/or non-detection probability.

According to another aspect, the invention relates to a method for validating the synchronization between a geolocation receiver and a transmitting satellite during a phase for acquiring an augmentation signal comprising geolocation correction and integrity data for a predetermined global navigation satellite system, said augmentation signal being provided by a service provider, said receiver being able to receive a plurality of augmentation signals coming from various transmitting satellites associated with at least one service provider, and to implement a phase for acquiring an augmentation signal for each of the transmitting satellites, in which the receiver determines a satellite transmitting a corresponding augmentation signal in a synchronization step.

The method is carried out by said receiver and includes, for each identified transmitting satellite, performing a validation test, comprising:
  extracting received words from the augmentation signal associated with the transmitting satellite identified in the acquisition phase, as said signal is received, and
  comparing a received word to a received word of the same type received for at least one of the other transmitting satellites, and, based on the result of the comparison, validating or not validating the synchronization with said identified transmitting satellite, when the comparisons done make it possible to achieve a predetermined false alarm probability and/or non-detection probability.

This synchronization validation method between a geolocation receiver and a transmitting satellite during a phase for acquiring an augmentation signal comprising geolocation correction and integrity data according to the invention may also have one or more of the features below, considered independently or in combination, according to all technically possible combinations.

After the extraction step, it includes a step for verifying a protection code associated with said received word extracted from the augmentation signal, the comparison being done on the extracted received words for which the verification is positive.

If said extracted received word associated with a first transmitting satellite is identical to an extracted received word associated with a second transmitting satellite, the method includes a verification step consisting of verifying whether said first satellite and said second satellite are associated with a same service provider, and in case of positive verification, receiving a word containing ephemerides for each of said first and second satellites and comparing received ephemerides with almanac data associated with said service provider.

It includes incrementing an invalidity counter, and not validating the synchronization when said invalidity counter reaches a predetermined value.

If said extracted received word associated with a first transmitting satellite is different from each of the received words associated with the other transmitting satellites, it includes incrementing a validity counter, and validating the synchronization when said validity counter reaches a predetermined value.

Said predetermined value depends on said false alarm probability and/or non-detection probability.

According to another aspect, the invention relates to a geolocation receiver performing a synchronization and a transmitting satellite during a phase for acquiring a navigation signal from this satellite, said receiver being able to receive a composite radio signal including a plurality of navigation signals each transmitted by a transmitting satellite that is part of a satellite constellation, and to implement a phase for acquiring a navigation signal for each of the transmitting satellites, in which the receiver determines a satellite transmitting a corresponding navigation signal in a synchronization step, each transmitting satellite further transmitting sets of ephemerides made up of a plurality of words, each having an associated rank, encoding information relative to said transmitting satellite and making it possible to compute the position of said transmitting satellite in a given plane of reference.

This receiver includes modules for performing a validation test for each identified transmitting satellite, comprising:
  a module for extracting ephemeris words from the navigation signal associated with the transmitting satellite identified in the acquisition phase, as said navigation signal is received,
  a module for comparing at least part of said extracted ephemeris words to at least one stored ephemeris word with the same rank for said identified transmitting satellite and/or for at least one of the other transmitting satellites, and
  a module for validating or not validating the synchronization with said identified transmitting satellite, based on the result of the comparison, when the comparisons done make it possible to achieve a predetermined false alarm probability and/or non-detection probability.

According to another aspect, the invention relates to a geolocation receiver validating the synchronization with a transmitting satellite during a phase for acquiring an augmentation signal comprising geolocation correction and integrity data for a predetermined global navigation satellite system, said augmentation signal being provided by a service provider, the receiver being able to receive a plurality of augmentation signals coming from various transmitting satellites associated with at least one service provider, and to implement a phase for acquiring an augmentation signal for each of the transmitting satellites, in which the receiver determines a satellite transmitting a corresponding augmentation signal in a synchronization step.

This receiver includes modules for performing a validation test for each identified transmitting satellite, comprising:
  a module for extracting received words from the augmentation signal associated with the transmitting satellite identified in the acquisition phase, as said signal is received,
  a module for comparing a received word to at least one received word of the same type received for at least one of the other transmitting satellites, and
  a module for validating or not validating the synchronization with said identified transmitting satellite, based on the result of the comparison, when the comparisons done make it possible to achieve a predetermined false alarm probability and/or non-detection probability.

BRIEF DESCRIPTION OF THE DRAWINGS

Other features and advantages of the invention will emerge from the description thereof provided below, for information and non-limitingly, in reference to the appended figures, in which.

DETAILED DESCRIPTION

Figure 1:
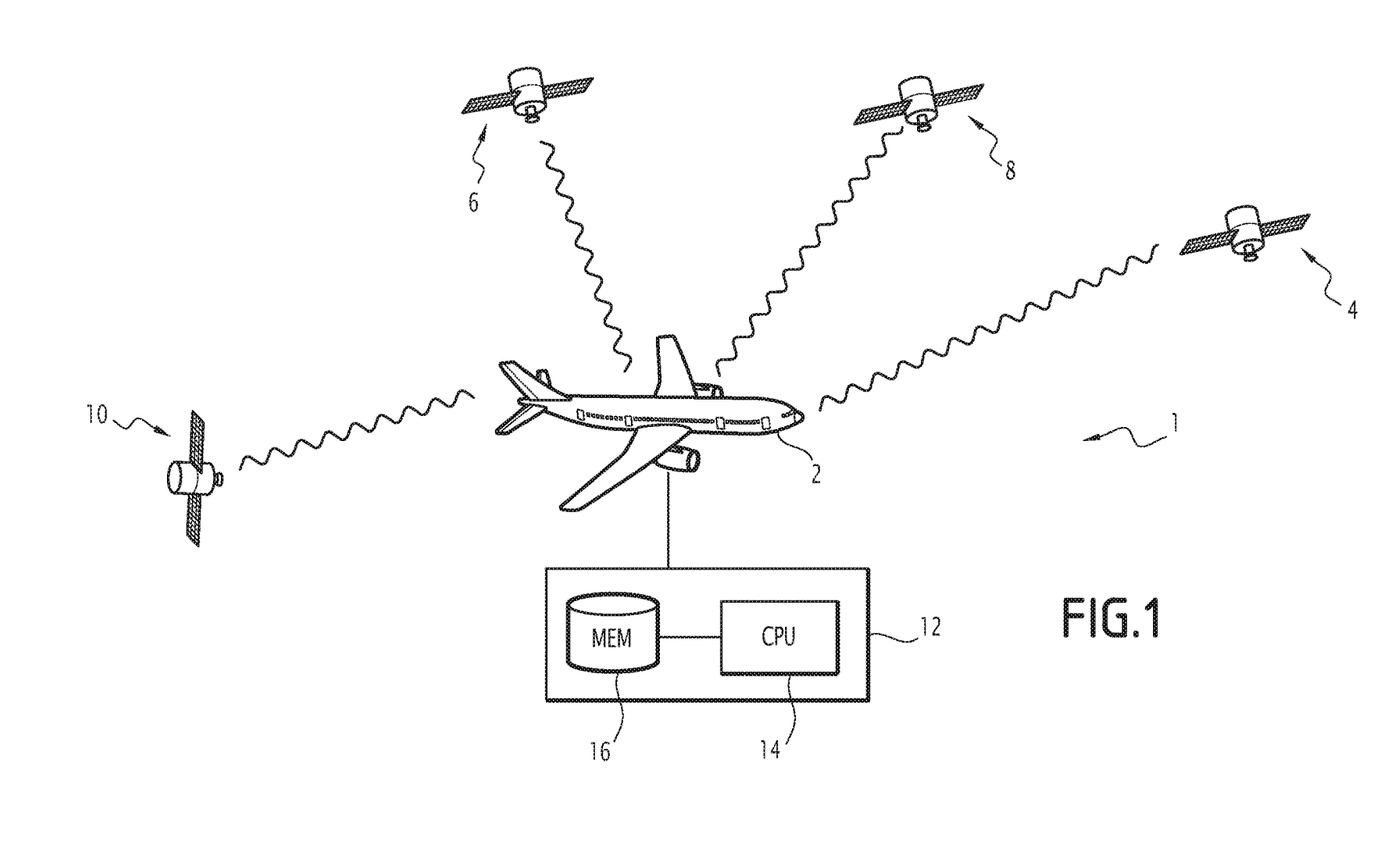
FIG. 1 is a diagrammatic illustration of a geolocation system.

FIG. 1 illustrates a geolocation system suitable for carrying out the invention, in the context of assisting in the navigation of a mobile carrier 2, which is an aircraft in the example of FIG. 1.

Of course, the invention is not limited to this embodiment, and more generally applies to the geolocation of any mobile carrier.

The mobile carrier 2 is equipped with a geolocation receiver 12, or GNSS receiver, able to receive radio navigation signals from a plurality of transmitting satellites 4, 6, 8, which are part of a satellite constellation of a GNSS geolocation system.

In a first embodiment, this is a satellite constellation of GPS system.

Alternatively, this is a satellite constellation of the GALILEO system, or any other GNSS system.

In general, the mobile carrier 2 is able to receive radio signals coming from a GNSS geolocation system, able to transmit in predefined frequency bands.

Each of the satellites transmits radio navigation signals, also comprising ephemeris data made up of a plurality of ephemeris words, making it possible to compute a position of the transmitting satellite in a given land-based plane of reference, with a given precision, for example a precision of several meters. Furthermore, the ephemeris contains information on the internal clock of the transmitting satellite.

In a known manner, the satellites are able to transmit signals over several transmitting frequencies, the signals having an associated periodic code.

For example, in the case of the GPS system, the GPS L1 C/A signals are transmitted at a frequency of 1575.42 MHz with a periodic spreading code of 1023 elements. The C/A codes are accessible to everyone and widely used in radio navigation applications.

These satellites may also transmit on other frequencies, for example 1227.60 MHz (L2 signals) or 1176.45 MHz (L5 signals).

In particular, ephemeris data can be transmitted in L5 signals, with a periodic code of 10,230 elements, allowing much greater immunity to cross-correlations then L1 signals.

Furthermore, alternatively, correction and integrity data for one or several satellites 10 of a geostationary satellite constellation, depending on the type of satellite-based augmentation system (SBAS), which are also transmitted in these radio signals transmitted on the same predefined frequency bands.

The receiver 12 includes several reception channels for receiving satellite-based augmentation signals coming from several satellites.

The GNSS receiver 12 in particular includes a computing device, including one or several computing processors 14, able to perform computations and execute computer program code instructions when they are powered on. The computing device also comprises one or several storage memories 16, able to store executable code instructions making it possible to run a program including code instructions able to carry out the method according to the invention.

In one embodiment, the computing device is a computer.

Alternatively, the computing device is an electronic device of the programmable logic circuit type, for example one or several FPGA- or ASIC-based electronic boards.

In particular, almanac data and ephemeris data relative to each of the considered satellites 4, 6, 8, 10 are stored in the memory 16.

The computing processor 14 implements modules for performing a synchronization validation test for each identified transmitting satellite, not shown in the figure, comprising:
- a module for extracting ephemeris words from the navigation signal associated with the satellite identified in the acquisition phase, as said navigation signal is received,
- a module for comparing at least part of said extracted ephemeris words to at least one stored ephemeris word with the same rank for said identified satellite and/or for at least one of the other transmitting satellites, and
- a module for validating or not validating the synchronization with said identified transmitting satellite, based on the result of the comparison, when the comparisons done make it possible to achieve a predetermined false alarm probability and/or non-detection probability.

Furthermore, the computing processor 14 implements modules for performing a validation test for each satellite 10 transmitting an augmentation signal comprising geolocation correction and integrity data, comprising:
- a module for extracting received words from the augmentation signal associated with the satellite identified in the acquisition phase, as said signal is received,
- a module for comparing a received word to at least one received word of the same type received for at least one of the other transmitting satellites, and
- a module for validating or not validating the synchronization with said identified transmitting satellite, based on the result of the comparison, when the comparisons done make it possible to achieve a predetermined false alarm probability and/or non-detection probability.

Figure 2:
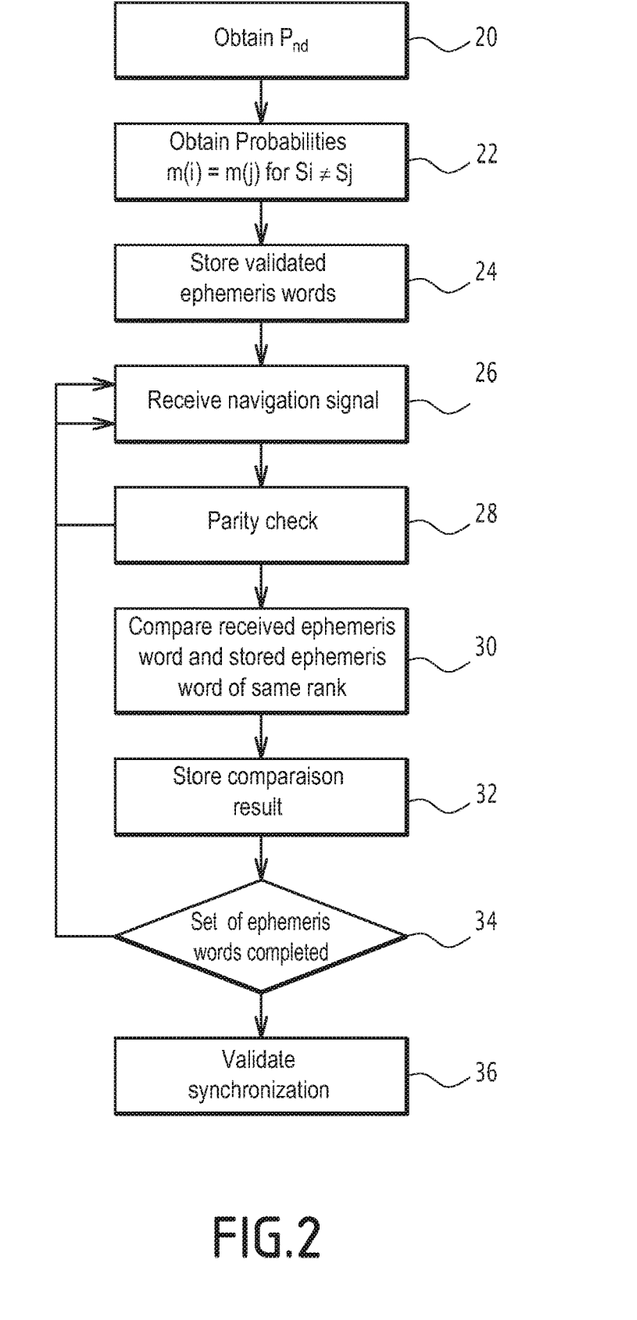
FIG. 2 is a summary of the main steps of a synchronization validation method according to a first embodiment of the invention.

FIG. 2 is a summary of the main steps of a synchronization validation method according to a first embodiment of the invention, implemented by a GNSS receiver 12.

This first embodiment in particular applies with the GPS system, in the context of a navigation signal reacquisition for a given satellite Si of the constellation, after a loss or concealment of the navigation signal previously acquired, on an associated channel.

It is assumed in this embodiment that one has ephemerides controlled and stored in the memory 16 for the satellite Si, or in other words, valid and non-obsolete ephemerides.

An ephemeris is made up of ephemeris data or words, each ephemeris word having an associated rank. For example, in a GPS system, there are 20 defined ephemeris words, with ranks (or indices) from 1 to 20. Reference m(i) denotes the ephemeris word with rank i. The ephemeris word m(i) transmitted by a given satellite at a given moment has an associated value.

The GPS signals are emitted periodically and made up of pages, each page being made up of sub-frames, each sub-frame being made up of a given number of words, each word being encoded over a given number of bits, emitted at a given frequency. The words are protected by a protection code or error detection code, for example a parity, allowing an easy detection of any losses or errors at the transmission level.

The ephemeris words with given ranks are distributed in various sub-frames of the GPS signals.

In this first embodiment, the method includes a first prior step 20 for obtaining a non-detection probability value $P_{nd}$, which is a parameter defined by an operator or based on security constraints for a specific application.

Next, a step 22 is carried out for obtaining and storing probabilities so that at a given moment, an ephemeris word with a same rank is identical for two separate satellites Si and Sj.

Let X(i) be the event associated with the fact that the word m(i) is identical in the ephemerides transmitted by two or more separate satellites.

There are thus as many events X(i) as there are separate ephemeris words.

In the prior step 20, one recovers an estimate of the probability P(X(i)) of each event X(i), as well as the set of probabilities $$P\left(\bigcap_{i \in A} X(i)\right),$$

$A \in \Omega_{GPS,Pnd}$ the events X(i) not being independent.

Preferably, this estimate is done from databases archiving the existing ephemerides for the constellation in question.

The computation of the probabilities is preferably done by a computer other than the geolocation receiver 12, and the values of the computed probabilities are provided to and stored by the receiver.

The a priori estimate of the probabilities can be redone at any time to account for any evolution in the considered GNSS system.

For the GPS system, the ephemeris of which is made up of 20 separate words, computations over a long stored ephemeris history have shown that the probabilities of events X(i) are different for different ephemeris words.

Furthermore, an a priori estimate is done, by estimating joint probabilities, of the set $\Omega_{Pnd}$ of sets A of ephemeris words, designated by their respective ranks, for the considered GNSS system, making it possible to ensure, with a non-detection probability $P_{nd}$ having a given value, that these words cannot come from multiple satellites.

Mathematically, this is written:

$$\Omega_{Pnd} = \left\{ A / A \subseteq \{1, \ldots, N\}, P\left(\bigcap_{i \in A} X(i)\right) < P_{nd} \right\} \quad \text{(Eq 1)}$$

For example, the estimated probabilities are as follows for the first two ephemeris words, m(1) and m(2): $P(X(1))=2.8 \times 10^{-2}$ and $P(X(3))=8.2 \times 10^{-3}$, and for the set $A=\{1,3\}$, the estimated probability is $$P\left(\bigcap_{i \in A} X(i)\right) = 9.5 \times 10^{-4}.$$

Steps 20 and 22 are repeated, if applicable, for several given non-detection probabilities $P_{nd}$.

For each of the given values of $P_{nd}$, the sets A of ephemeris word ranks are stored, for example in the form of tables or any other suitable form.

It should be noted that the set of indices A determined for a given non-detection probability have different cardinals based on estimated probabilities P(x(i)), the non-detection probability also depending on the ranks of the received indices. Thus, for example, for the GPS system and a non-detection probability of $10^{-4}$, sets of one, two or three ephemeris words form the set $$\Omega_{Pnd} = \left\{ A / A \subseteq \{1, \ldots, N\}, P\left(\bigcap_{i \in A} X(i)\right) < P_{nd} \right\}.$$

For each considered satellite Si, values of checked and validated ephemeris words are stored during step 24.

In one embodiment, the values are received by the receiver via another communication channel, for example by a GSM radio communication or by an Internet communication.

Alternatively, values of stored ephemeris words have been received beforehand from the transmitting satellite Si and validated using a traditional validation method, for example the validation method relative to the previously stored almanac data.

According to another alternative, values of stored ephemeris words have been transmitted by the satellite Si by a frequency other than the radio navigation signal to be processed, for example by the L5 signals, for which the risk of cross-correlation is very low.

The ephemeris words stored for a satellite Si are denoted $M_i^m(k)$, $k \in \{1, \ldots, N\}$, k indicating the corresponding rank, i the associated index, and N being the number of ephemeris words of the GNSS system, for example N=20 for the GPS.

During a step 26, a navigation signal Sig is received on the considered channel, and associated ephemeris words are extracted from this signal.

The signal Sig is considered to have been received from the transmitting satellite Sj following the signal acquisition phase including a synchronization by correlation.

These ephemeris words are called received words, and they are denoted $M_j^r(k)$, $\in \{1, \ldots, N\}$.

The method aims to validate, or not validate, the synchronization with the signal Sj, in other words to validate, with an associated non-detection probability, whether the ephemerides received with the signal Sig are transmitted by the signal Sj or whether they may be transmitted by another satellite Si of the constellation.

To that end, the step 26 for receiving and extracting received ephemeris words is followed by a step 28 for verifying the parity of each received ephemeris word.

Indeed, as explained above, this is a protection mechanism intended to detect any transmission errors and therefore to avoid the use of erroneous ephemeris words.

More generally, a verification of the protection code of the received word is applied.

In case of negative verification, step 28 is followed by the aforementioned step 26.

In case of positive verification, step 28 is followed by a step 30 for comparing each of the extracted received ephemeris words $M_j^r(k)$ with the stored ephemeris word having the same rank $M_j^m(k)$, for the satellite Sj previously identified in the navigation signal acquisition step.

It should be noted that the received ephemeris words are extracted from the received sub-frames as they are received and processed, which results in decreasing the total validation time for the synchronization with the satellite Sj.

Thus, a sub-set of received ephemeris words is processed in step 28, this sub-step being able to be limited to a single ephemeris word.

If $M_j^r(k) = M_j^m(k)$, the value of the received word is indeed equal to the value of the stored word with the same rank k, for the satellite Sj. As explained above, in this case, one has an estimate of the probability of the received ephemeris word $M_j^r(k)$ coming from a satellite other than the satellite Sj.

The result of the comparison is stored and added to the preceding results in the processing step 32.

In one embodiment of the processing step 32, the rank k of the ephemeris word received and validated by the comparison is stored, and it is verified whether k belongs to one of the sets A of stored ephemeris word ranks to reach the given non-detection probability $P_{nd}$.

The non-detection probability $P_{nd}$ parameter is for example entered by an operator and provided as input for the method or imposed by an application using the geolocation receiver.

For example, $P_{nd}$ is $10^{-3}$ or $10^{-4}$ for typical applications.

In step 34 following step 32, it is verified whether one of the sets A of ephemeris word ranks has been completed, in other words whether all of the words of a set A have been received and validated by comparison with stored ephemeris words, thereby ensuring that these words are sent by the considered transmitting satellite Sj with a non-detection probability below $P_{nd}$.

In case of positive response, the validation of the synchronization with the transmitting satellite Sj is validated for the received navigation signal Sig. The algorithm ends (step 36). In case of negative response, step 34 is followed by step 26 for receiving [and] extracting ephemeris words as previously described.

In case of negative response, when all of the GPS ephemeris words have been received, the receiver compares the decoded ephemerides to the almanacs to determine whether cross-correlations are present.

Thus, in the general case of an absence of cross-correlations and absence of change in the ephemerides since reception of the signal was cut, the validation of the synchronization is very quick. In the specific cases of low occurrence, ephemeris changes during the cutoff or cross-correlation, all of the GPS ephemeris words are verified.

Advantageously, if the first ephemeris words received and processed during the application of this first performance moment are validated and distinctive enough in terms of probabilities, the synchronization validation is very quick.

For example, with a non-detection probability $P_{nd}=10^{-4}$, the synchronization validation, or confirmation of absence of cross-correlation, takes 0.6 seconds in the most favorable case, in which the first received and processed ephemeris word is distinctive, and may take up to a maximum of 17.4 seconds.

In all cases, the validation is much quicker when the traditional and systematic validation is applied.

It should be noted that this first embodiment described above applies for satellite constellations other than the GPS constellation, as long as sufficient data is available to obtain an estimate of the probability of a priori events X(i).

Figure 3:
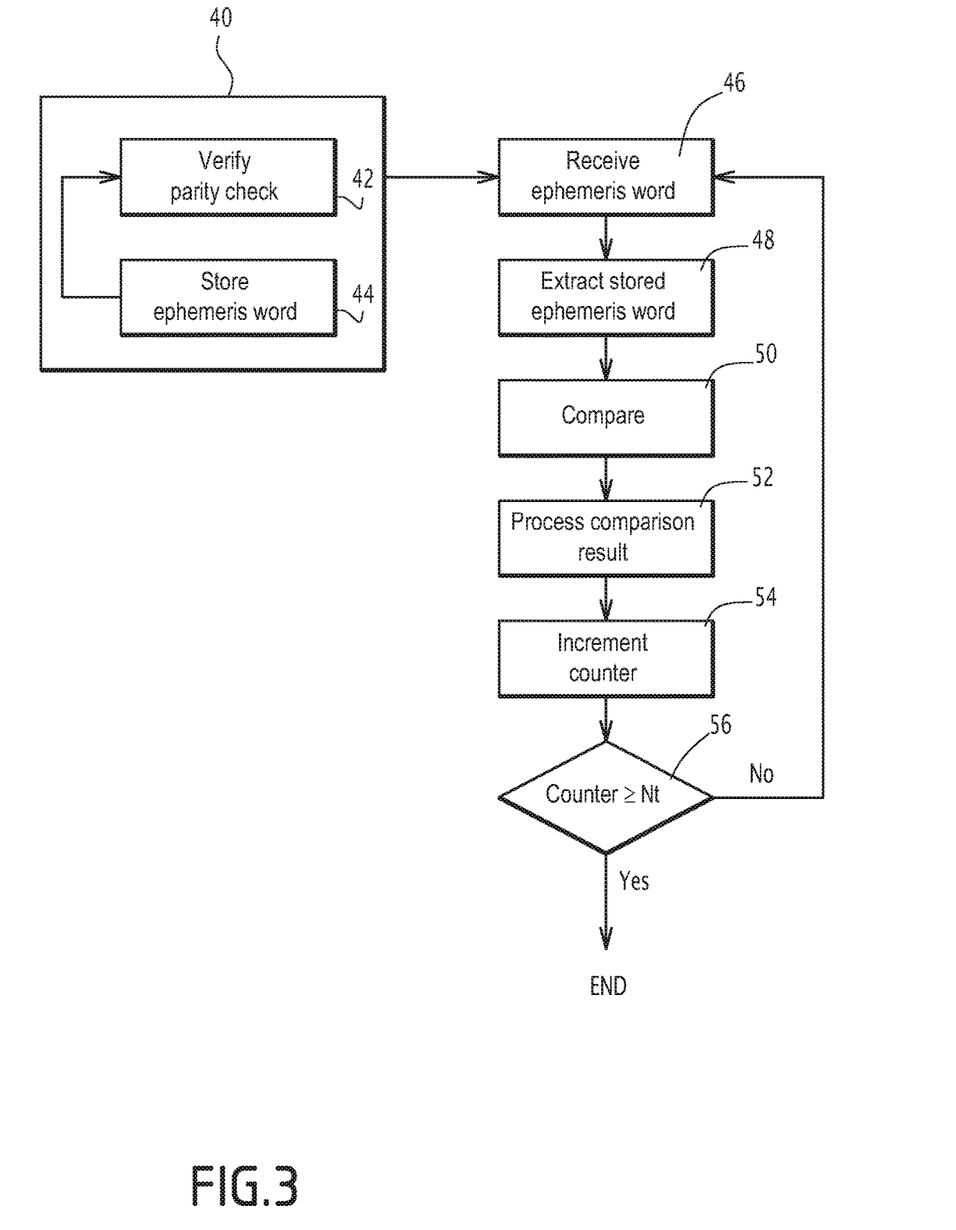
FIG. 3 is a summary of the main steps of a synchronization validation method according to a second embodiment of the invention.

A second embodiment of the synchronization validation method with a transmitting satellite Sj, implemented by a GNSS receiver 12, is described in reference to FIG. 3.

This second embodiment differs from the first embodiment because it only requires an a priori estimate of the probabilities of two ephemeris words transmitted at the same time by two separate transmitting satellites to be identical.

In a known manner, the GNSS receiver simultaneously receives and processes several reception channels, each reception channel being associated with a transmitting satellite during the navigation signal acquisition phase.

In this second embodiment, it is assumed that the processed navigation signal Sig is a strong enough signal to generate a cross-correlation on a current reception channel, and that it is also received in the acquisition phase on a another channel of the GNSS receiver.

In this second embodiment, a first step 40 is carried out on all of the reception channels, to extract and store the received ephemeris words, each channel being associated with a transmitting satellite.

This step is carried out following the prior navigation signal acquisition for each channel and includes, for each reception channel, a first sub-step 42 for extracting and verifying the parity of each received ephemeris word and a sub-step 44 for storing the ephemeris words whose parity has been verified, in relation with the processed reception channel.

Thus, for each reception channel associated with a transmitting satellite with index I, $I\in\{1, \ldots, N_C\}$ where Nc designates the number of reception channels, ephemeris words are stored: $M_i^m(k)$, $k\in\{1, \ldots, N\}$ where N is the number of ephemeris words (equal to 20 for the GPS system), and for which the parity has been verified, in order to avoid the subsequent use of erroneous ephemeris words.

Substantially in parallel, and over the course of the reception, when step 44 is implemented for a given processed channel, called current channel, associated with a transmitting satellite Si, called current satellite, for which the synchronization validation is carried out, the received word is obtained whose parity was verified $M_i^r(p)$ in step 46.

Next, the word with the corresponding rank is extracted from a set of stored ephemeris words associated with the transmitting satellite Si in step 48, denoted $M_i^m(p)$.

The ephemeris words $M_i^r(p)$ and $M_i^m(p)$ are compared in step 50.

Furthermore, the received ephemeris word $M_i^r(p)$ is compared, during the comparison step 50, to all of the ephemeris words with the same rank and validated, received on the other reception channels, denoted $M_j^r(p)$, $j\neq i$.

The results of the comparison are processed during a processing step 52.

If the ephemeris words $M_i^r(p)$ and $M_i^m(p)$ are identical, and the ephemeris word $M_i^r(p)$ is different from all of the received words with the same rank $M_j^r(p)$, $j\neq i$, on a different reception channel, then the synchronization is validated for this word, therefore considered not to be tainted by cross-correlation.

A validity counter $C_{valid}$ is incremented in step 54, this counter being initialized at 0 upon each new implementation of the synchronization validation method.

If the ephemeris words $M_i^r(p)$ and $M_i^m(p)$ are different, and the ephemeris word $M_i^r(p)$ has the same value as one or several of the received words with the same rank $M_j^r(p)$, $j\neq i$, on a different reception channel, then the synchronization is invalidated for this word, therefore considered not to be tainted by cross-correlation.

An invalidity counter $C_{invalid}$ is incremented in step 54, this counter being initialized at 0 upon each new implementation of the synchronization validation method.

It should be noted that the validity $C_{valid}$ and invalidity $C_{invalid}$ counters are only incremented for words with different ranks. Thus, a word with a same rank received again cannot contribute to incrementing a non-zero counter.

In step 56, it is next verified whether the validity counter or, if applicable, the invalidity counter, has reached a number of ephemeris words to be taken into consideration Nt.

This number Nt depends on the values of the non-detection probability $P_{nd}$ and the false alarm probability $P_{fa}$ of a cross-correlation.

When the number Nt is reached, the synchronization validation method for the navigation signal received on the current channel ends.

If the number Nt is not reached, step 56 is followed by step 46 previously described for processing a following ephemeris word for the channel associated with the transmitting satellite Si.

If the validation of the synchronization is negative, advantageously, the reacquisition of the synchronizations can be relaunched without waiting, which makes it possible to improve the radio navigation.

The number Nt of ephemeris words to be taken into account is equal to 1 in one embodiment.

For a given received ephemeris word, it is possible to compute the associated non-detection probability and false alarm probability.

Regarding the non-detection probability, there is a risk of non-detection if a word is incorrectly decoded. The non-detection probability due to such an error depends on the word error rate (WER), which depends on the received signal-to-noise ratio, wrongly considered to be valid.

For a GPS word encoded on 24 bits and protected by 6 bits of parity, one has: $P_{nd} < WER \times 2^{-6} \times 2^{-24}$, where $2^{-6}$ is the error probability for a word protected by 6 bits of parity and $2^{-24}$ is the probability that the received word is equal to a received word for another satellite.

According to one embodiment, the false alarm probability, which is the probability of the false detection of a cross-correlation phenomenon, is computed relative to the renewal of the sent ephemerides relative to the ephemerides stored by a same satellite, this renewal being done at a given frequency, for example 2 hours.

The number Nt of ephemeris words to be taken into consideration is determined differently depending on whether the processing knows that the sent ephemerides have or have not been changed with respect to the stored ephemerides. One of the ephemeris words allows it to be dated. If it is received and equal to that of the stored ephemeris, Nt will be determined on an absence of change hypothesis; if it is not yet received or if it is received different from that of the stored ephemeris, Nt will be determined on a change hypothesis.

Indeed, if the sent ephemerides have not changed relative to the stored ephemerides for a given transmitting satellite, the false alarm probability is computed based on the decoding error WER, parity error ($2^{-6}$) and equality probability of the decoded word relative to one of the words of the same rank decoded on another one of the satellites $(1-(1-2^{-24})^{N_c-1})$.

If the receiver receives Nc satellites, one has:

$$P_{fa} < WER \times 2^{-6} \times (1-(1-2^{-24})^{N_c-1}) \quad (Eq\ 2)$$

For Nc=10, one has a false alarm probability significantly below $10^{-8}$.

If the sent ephemerides have changed relative to the stored ephemerides for a given transmitting satellite, the false alarm risk is higher.

Let Y(i) be the event associated with the fact that the words m(i) from two ephemeris tables transmitted successively by a same satellite are identical.

One then has:

$$P_{fa} = P\left(\bigcap_{i \in A} Y(i)\right)\left(1 - \left(1 - P\left(\bigcap_{i \in A} X(i)\right)\right)^{N_c}\right) \approx \quad (Eq\ 3)$$

$$N_c \cdot P\left(\bigcap_{i \in A} Y(i)\right) \cdot P\left(\bigcap_{i \in A} X(i)\right)$$

where A is the set of ranks (or indices) of the received ephemeris words verifying the invalidation criterion, and Nc the number of received transmitting satellites.

For example, if one wishes to have a false alarm probability $P_{fa} < 10^{-3}$, and Nc=10, one uses the sets of indices A that provide an associated a priori probability estimate of $10^{-4}$, as explained above relative to the first embodiment.

The probabilities of the events Y(i) are estimated a priori, on another computer, only to determine the value Nt stored by the receiver based on Nc. The determination of the probabilities $$P\left(\bigcap_{i \in A} Y(i)\right)$$

is done in the same manner as to determine the probabilities $$P\left(\bigcap_{i \in A} X(i)\right):$$

this estimate is done from databases archiving the existing ephemerides for the constellation in question.

As in the first embodiment described above, it is possible to use a priori estimates of the probabilities.

It should be noted that in this scenario, the number Nt of ephemeris words to be taken into consideration for a given false alarm probability also depends on the ranks of the received indices, sets of one, two or three ephemeris words, that are part of the set e defined in the equation (Eq 1) above:

$$\Omega_{Pnd} = \left\{A/A \subseteq \{1, \ldots, N\}, P\left(\bigcap_{i \in A} X(i)\right) < P_{nd}\right\}.$$

Alternatively, if one does not have an a priori estimate of the probabilities, it suffices, upon the renewal of the ephemerides sent by a satellite, to consider the set of received ephemeris words. In this alternative, no a priori probability estimate is necessary.

The method proposed above nevertheless applies and makes it possible to greatly accelerate validation of the synchronization during the entire operating phase with a same set of ephemeris data.

The method proposed above in this second embodiment applies similarly for the GALILEO L1 BC radio navigation signals.

The GALILEO L1 BC signals have a periodic code of 4092 elements, but are not robust enough to guarantee the absence of cross-correlations.

The method described above applies with the ephemeris data of the GALILEO system, taking into account the specific arrangement of the I/NAV navigation messages and the protection code, which is a CRC (cyclic redundancy check) code, applied on a plurality of transmitted ephemeris words.

It should be noted that the ephemeris word with rank 4 in the GALILEO system bears the identifier of the transmitting satellite, therefore an error-free decoding of this ephemeris word making it possible to identify the transmitting satellite.

However, the ephemeris words are transmitted cyclically; it is therefore possible to have to wait for up to 30 seconds to decode the ephemeris word with rank 4.

If a quicker synchronization validation is desired, the method according to the invention described above applies, and in particular the second embodiment, which does not require an a priori computation of probabilities associated with the ephemeris words transmitted by the various satellites in the constellation.

The non-detection $P_{nd}$ and false alarm $P_{fa}$ probability computations are adapted to the scenario of the GALILEO system.

For example, for an ephemeris word protected by a 24-bit CRC code, and encoded on 110 bits, one has:

$$P_{nd} < WER \times 2^{-24} \times 2^{-110} \ll 4 \cdot 10^{-41}$$

Advantageously, using a single ephemeris word to validate or invalidate the presence of a cross-correlation contributes a high level of integrity, which limits the validation time to a minimum of 2 seconds and a maximum of 18 seconds.

Figure 4:
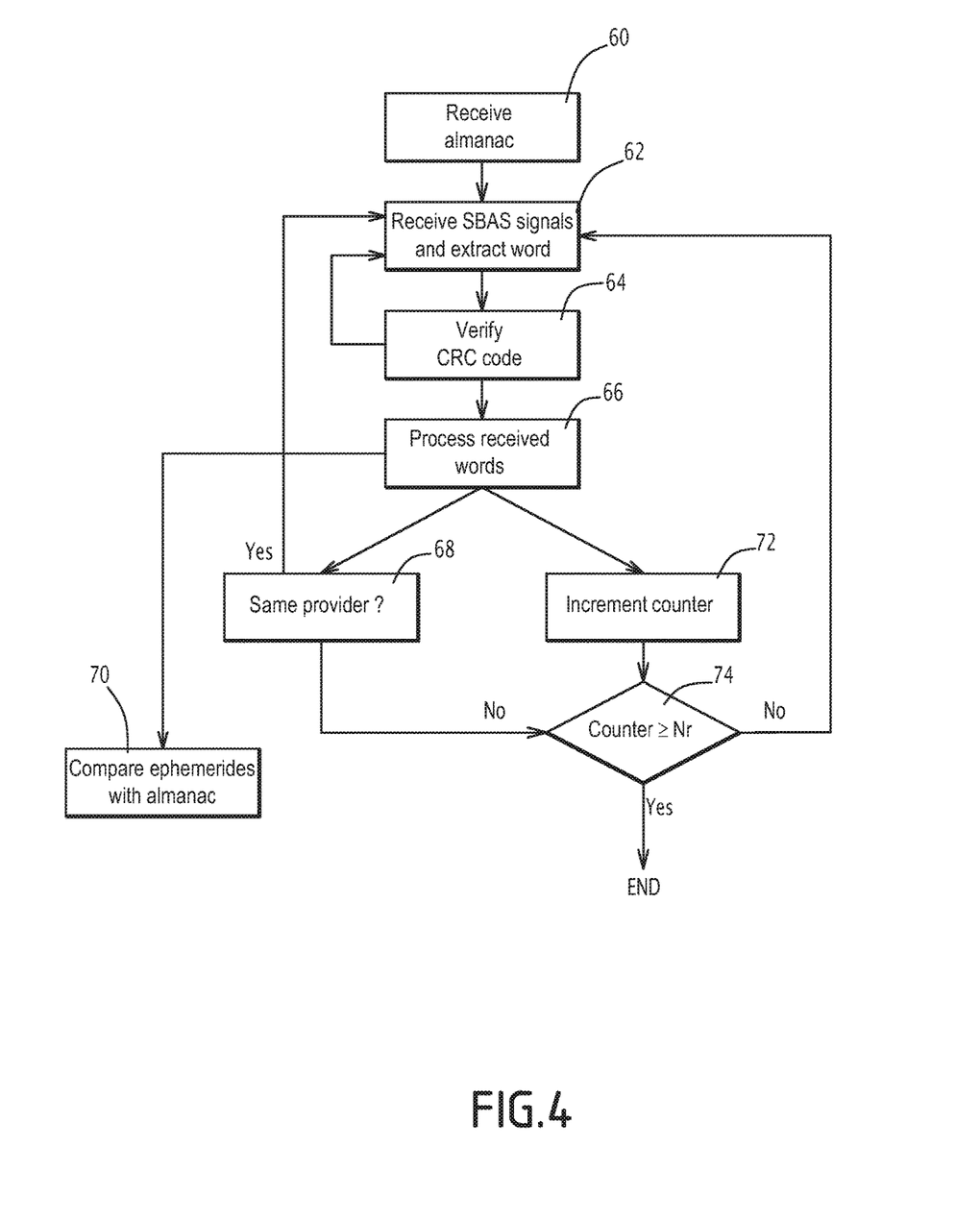
FIG. 4 is a summary of the main steps of a synchronization validation method according to a third embodiment of the invention.

According to a third embodiment, the invention also applies to the case of augmentation signals, for example SBAS, comprising geolocation correction and integrity data for a predetermined global navigation satellite system, in the case of receivers suitable for receiving several SBAS signals on several reception channels, and therefore may experience the erroneous synchronization phenomenon on a transmitting SBAS satellite, due to a cross-correlation.

Each reception channel is associated with a transmitting SBAS satellite.

The SBAS signals are sent by service providers, who generally have several satellites. For example, the service providers EGNOS® for Europe and WAAS® for the United States, GAGAN® for India, MSAS® for Japan are known.

Each service provider's satellites send ephemerides, but only at lower time frequencies than the geolocation satellites.

Furthermore, each service provider transmits almanacs for the satellites in its constellation.

FIG. 4 is a block diagram of the main steps carried out in the third embodiment of the synchronization validation method with a transmitting satellite Sj of a spaced-based augmentation system SBAS, implemented by a receiver able to receive SBAS-type signals on several reception channels.

The method according to the invention is adapted to this scenario, in which the sending of ephemerides is grouped and sent at a low frequency (for example, every 120 seconds for SBAS).

In the SBAS system, each word, without type-based distinction, is made up of 250 bits and is protected by a 24-bit CRC protection code.

During a first step 60, the almanacs from the various service providers are received and stored.

This step 60 is carried out by any appropriate communication means, for example by using another communication channel—GSM, Internet or another appropriate communication channel.

Step 60 is followed by a step 62 for receiving SBAS signals after acquisition or reacquisition on each of the processed reception channels, and extracting a current received word having an associated type, then a step 64 for verifying the CRC code of the received word.

In case of negative verification in step 64, therefore if there is a possible reception error on the received word, step 64 is followed by the preceding step 62 for receiving and extracting a new received word.

In case of positive verification in step 64, the received word is stored in relation with the associated channel to next perform comparisons between received words.

During the processing step 66, if the received word corresponds to the reception of the ephemeris word, then step 66 is followed by step 70 described below; otherwise, the received word on the current reception channel is compared to the received words of the same type on the other reception channels.

Step 70, which corresponds to the reception of the ephemeris word, consists of comparing the ephemerides with the almanac data previously stored for the current service provider.

The comparison will then make it possible to reveal the existence of a cross-correlation.

In case of positive comparison in step 66, therefore if the current received word, coming from the current reception channel, called first channel, is identical to a first received word from a second channel, and the type of the word is different from the type 0 in the SBAS system where the words of type 0 have a fixed content, then step 66 is followed by a step 68.

In step 68, it is verified whether the first channel and the second channel are both associated with satellites from a same service provider, called current service provider.

In case of positive response, step 68 is followed by step 62.

In case of negative response in step 68, therefore if the first channel and the second channel are associated with satellites from different service providers, an invalidity counter $C_{invalid}$ is incremented. Step 68 is followed by step 74 described below.

As in the second embodiment, the invalidity counter $C_{invalid}$ is initialized at 0 upon each new implementation of the synchronization validation method.

If, in step 66, the current received word coming from the current reception channel, called first channel, is different from all of the words of the same type received in all of the other channels, then the signal is considered to be valid and therefore not tainted by a cross-correlation.

A validity counter $C_{valid}$ is incremented in step 72, this counter being initialized at 0 upon each new implementation of the synchronization validation method.

Step 72 is followed by a step 74 for comparing the validity counter or, if applicable, the invalidity counter, to a number of received words to be taken into consideration Nr.

This number Nr depends on the values of the non-detection probability $P_{nd}$ and the false alarm probability $P_{fa}$ of a cross-correlation.

When the number Nr is reached, the synchronization validation method for the navigation signal received by the space-based augmentation system on the current channel ends.

If the number Nr is not reached, step 74 is followed by step 62 previously described for processing a following received word.

The number Nr of received words to be taken into account is equal to 1 in one embodiment.

For a given received word, it is possible to compute the associated cross-correlation non-detection probability and false alarm probability.

Regarding the non-detection probability, there is a risk of non-detection if a word is incorrectly decoded. The non-detection probability due to such an error depends on the word error rate (WER), which depends on the received signal-to-noise ratio, wrongly considered to be valid.

For a SBAS word encoded on 250 bits and protected by a 24-bit CRC code, one has: $P_{nd} < WER \times (1-(1-$ $2^{-24})^{120})<<7\cdot 10^{-6}$. Using a single received word to confirm the absence of cross-correlation contributes a high integrity level.

There is a false alarm risk if two words transmitted by two satellites from different service providers are identical.

According to one embodiment, the false alarm probability, which is the probability of the false detection of a cross-correlation phenomenon, is computed by:

$$P_{fa}<2^{-218}<2\cdot 10^{-66}$$

Using a single word to confirm the presence of cross-correlation contributes a low risk of false alarms.

Advantageously, in all of the described embodiments, the validation or invalidation of the synchronization with a transmitting satellite is accelerated owing to the use of received words received for the same transmitting satellite previously identified in the acquisition phase, and, if applicable, for other transmitting satellites in the constellation that are received by the geolocation receiver in question.

In the case of space-based augmentation systems, this involves received words without type-based distinction, while for GNSS radio navigation systems, it involves ephemeris words.

The invention claimed is:

1. A method for validating the synchronization between a geolocation receiver and a transmitting satellite during a phase for acquiring a navigation signal from the satellite, the receiver receiving a composite radio signal including a plurality of navigation signals each transmitted by a transmitting satellite that is part of a satellite constellation, and implementing a phase for acquiring a navigation signal for each of the transmitting satellites, in which the receiver identifies a satellite transmitting a corresponding navigation signal, each transmitting satellite further transmitting sets of ephemerides comprised of a plurality of words, each having an associated rank, encoding information relative to the transmitting satellite and enabling computation of the position of the transmitting satellite in a given plane of reference, the method being implemented by the receiver, the method comprising, for each identified transmitting satellite, performing a validation test, comprising:
   extracting ephemeris words from the navigation signal associated with the transmitting satellite identified in the acquisition phase, in the course of reception of the navigation signal;
   when an ephemeris word is extracted:
      comparing the extracted ephemeris word to at least one stored ephemeris word with the same rank for the identified transmitting satellite and/or for at least one of the other transmitting satellites;
      based on the result of said comparing, determining whether the navigation signal from which the ephemeris words are extracted is transmitted by the identified transmitting satellite, with a predetermined false alarm probability and/or non-detection probability; and
   in case said determining is affirmative:
      validating the synchronization; and
      stopping the validation test; and
   in case said determining is negative, returning to said extracting.

2. The method according to claim 1, further comprising, between said extracting and said comparing, verifying validity of a protection code associated with one or several of the extracted ephemeris words, the protection code comprising at least one parity bit or a cyclic redundancy check code, wherein the comparison is performed on the extracted ephemeris words for which the verification of validity of the protection code is positive.

3. The method according to claim 1, further comprising storing ephemeris words previously validated for the transmitting satellite, and comparing a received ephemeris word with the stored ephemeris word with the same rank for the transmitting satellite.

4. The method according to claim 2, further comprising, prior to said extracting, estimating a probability, for each ephemeris word of the set of ephemerides, that an ephemeris word, having an associated rank and transmitted by a given transmitting satellite, has a same value as a transmitted ephemeris word with the same rank transmitted by another satellite in the satellite constellation.

5. The method according to claim 4, further comprising computing sets of ranks of ephemeris words, each set of ranks comprising ephemeris word ranks, so as to allow validation of synchronization with the associated transmitting satellite with a corresponding non-detection probability.

6. The method according to claim 5, further comprising storing at least one set of computed ephemeris rank sets corresponding to a predetermined non-detection probability.

7. The method according to claim 6, further comprising validating based on whether the rank of the received ephemeris word belongs to at least one of the computed sets of ephemeris ranks, in case of positive comparison of a received ephemeris word with an ephemeris word previously validated and stored for the transmitting satellite.

8. The method according to claim 1, further comprising comparing an extracted ephemeris word with a stored ephemeris word having the same rank for the identified transmitting satellite, and with an ephemeris word of the same rank received for each of the plurality of other transmitting satellites.

9. The method according to claim 8, further comprising incrementing a validity counter when the extracted ephemeris word is identical to the stored ephemeris word having the same rank for the identified transmitting satellite, and different from each of the ephemeris words having the same rank received for another transmitting satellite.

10. The method according to claim 8, further comprising incrementing an invalidity counter when the extracted ephemeris word is different from the stored ephemeris word having the same rank for the identified satellite, and identical to at least one of the words having the same rank received for another transmitting satellite.

11. The method according to claim 9, wherein e the synchronization is validated or invalidated based on the comparison of the validity counter or invalidity counter to a number of comparisons to be taken into consideration, the number of comparisons to be taken into consideration depending on the predetermined false alarm probability and/or non-detection probability.

12. A method for validating the synchronization between a geolocation receiver and a transmitting satellite during a phase for acquiring an augmentation signal comprising geolocation correction and integrity data for a predetermined global navigation satellite system, the augmentation signal being provided by a service provider, the receiver receiving a plurality of augmentation signals coming from various transmitting satellites associated with at least one service provider, and implementing a phase for acquiring an augmentation signal for each of the transmitting satellites, in which the receiver identifies a satellite transmitting a corresponding augmentation signal, the method being implemented by the receiver and comprising, for each identified transmitting satellite, performing a validation test, comprising:
   extracting received words from the augmentation signal associated with the transmitting satellite identified in the acquisition phase, in the course of the reception of the augmentation signal;
   when a word is extracted:
      comparing the extracted word to at least one received word of the same type received for at least one of the other transmitting satellites;
      based on the result of said comparing, determining whether the navigation signal from which the words are extracted is transmitted by the identified transmitting satellite, with a predetermined false alarm probability and/or non-detection probability;
      in case said determining is affirmative:
         validating the synchronization; and
         stopping the validation test; and
      in case said determining is negative, returning to said extracting.

13. The method according to claim 12, further comprising, after said extracting, verifying a protection code associated with the received word extracted from the augmentation signal, the protection code comprising at least one parity bit or a cyclic redundancy code, and wherein said comparing is performed on the extracted received words for which the verification of the protection code is positive.

14. The method according to claim 12, further comprising:
   when the extracted received word associated with a first transmitting satellite is identical to an extracted received word associated with a second transmitting satellite, verifying whether the first satellite and the second satellite are associated with a same service provider;
   when said verifying is affirmative, receiving a word containing ephemerides for each of the first and second satellites; and
   comparing the received ephemerides with almanac data associated with the service provider.

15. The method according to claim 14, further comprising, in case of negative verification:
   incrementing an invalidity counter; and
   not validating the synchronization when the invalidity counter reaches a predetermined value.

16. The method according to claim 12, further comprising:
   incrementing a validity counter when the extracted received word associated with a first transmitting satellite is different from each of the received words associated with the other transmitting satellites; and
   validating the synchronization when the validity counter reaches a predetermined value.

17. The method according to claim 15, wherein the predetermined value depends on the false alarm probability and/or non-detection probability.

18. A geolocation receiver performing a synchronization with a transmitting satellite during a phase for acquiring a navigation signal from this satellite, the receiver receiving a composite radio signal comprising a plurality of navigation signals each transmitted by a transmitting satellite that is part of a satellite constellation, and implementing a phase for acquiring a navigation signal for each of the transmitting satellites, in which the receiver identifies a satellite transmitting a corresponding navigation signal, each transmitting satellite further transmitting sets of ephemerides comprised of a plurality of words, each having an associated rank, encoding information relative to the transmitting satellite and enabling computing the position of the transmitting satellite in a given plane of reference, the receiver comprising modules performing a validation test for each identified transmitting satellite, the modules comprising:
   a module for extracting each ephemeris word from the navigation signal associated with the transmitting satellite identified in the acquisition phase, in the course of reception of the navigation signal;
   a module for comparing the extracted ephemeris words to at least one stored ephemeris word with the same rank for the identified transmitting satellite and/or for at least one of the other transmitting satellites; and
   a module for validating or not validating the synchronization with the identified transmitting satellite, the module being programmed to based on the result of said module for comparing:
      determine whether the navigation signal from which the ephemeris words are extracted is transmitted by the identified transmitting satellite, with a predetermined false alarm probability and/or non-detection probability;
      in case of positive determination
         validate the synchronization; and
         stop the validation test; and
      in case of negative determination, return to said module for extracting.

19. A geolocation receiver validating the synchronization with a transmitting satellite during a phase for acquiring an augmentation signal comprising geolocation correction and integrity data for a predetermined global navigation satellite system, the augmentation signal being provided by a service provider, the receiver receiving a plurality of augmentation signals coming from various transmitting satellites associated with at least one service provider, and implementing a phase for acquiring an augmentation signal for each of the transmitting satellites, in which the receiver identifies a satellite transmitting a corresponding augmentation signal, the receiver comprising modules for performing a validation test for each identified transmitting satellite, the modules comprising:
   a module for extracting words from the augmentation signal associated with the transmitting satellite identified in the acquisition phase, in the course of reception of the augmentation signal;
   a module for comparing a each extracted word to at least one received word of the same type received for at least one of the other transmitting satellites; and
   a module for validating or not validating the synchronization, the module being programmed to, based on the result of the module for comparing, determine whether the navigation signal from which the words are extracted is transmitted by the identified transmitting satellite, with a predetermined false alarm probability and/or non-detection probability;
   in case of positive determination:
      validate the synchronization: and
      stop the validation test; and
   in case of negative determination, return to said module for extracting.

* * * * *